United States Patent

[11] 3,539,046

| | | |
|---|---|---|
| [72] | Inventor | David A. Berg |
| | | Milwaukee, Wisconsin |
| [21] | Appl. No. | 714,969 |
| [22] | Filed | March 21, 1968 |
| [45] | Patented | Nov. 10, 1970 |
| [73] | Assignee | Allis-Chalmers Manufacturing Company |
| | | Milwaukee, Wisconsin |

[54] FLUID LEAKAGE DRAIN FOR TRACTOR WINCH
4 Claims, 3 Drawing Figs.

[52] U.S. Cl. .................................................. 192/85,
192/17, 192/30, 285/14, 254/187
[51] Int. Cl. ............................................................ F16d 25/00
[50] Field of Search............................................ 192/85,
85(A2), 85(AT), 12-1, 17-1, 18-1, 30(WI); 285/13,
14(GP352)

[56] References Cited
UNITED STATES PATENTS

| | | | |
|---|---|---|---|
| 2,180,218 | 11/1939 | Wissman ..................... | 192/18.1 |
| 2,506,842 | 5/1950 | Rockwell..................... | 192/17.1 |
| 2,880,834 | 4/1959 | Gerst............................ | 192/85(A2) |
| 3,129,960 | 4/1964 | Schrodt........................ | 285/14(A) |

*Primary Examiner*—Benjamin W. Wyche, III
*Attorney*—Arthur L. Nelson, Charles L. Schwab and Robert B. Benson ABSTRACT: A hydraulic system for operating a tractor winch having an internal swivel connector and means for externally venting fluid leakage from the internal passages of the winch.

Patented Nov. 10, 1970 3,539,046

Inventor
David A. Berg
By Arthur Nelson
Attorney 3,539,046

FLUID LEAKAGE DRAIN FOR TRACTOR WINCH

This invention relates to a tractor winch and more particularly to a swivel connector for connecting stator and rotor portions internally of the winch and venting externally any fluid leakage from the swivel connector.

Modern tractor winches have in the most part employed hydraulic means for controlling the operating of the winch. A brake and a clutch control the rotating movement of the winding drum. With the operation of the winches controlled by a clutch and a brake it is customary to employ a normally applied brake and a normally disengaged clutch. When the clutch is engaged to permit taking in cable, the brake is released to permit the winding drum to be driven. The brake release is preferably after the engagement of the clutch in order to prevent reverse rotation of the drum under cable load. It is also customary to provide additional control for releasing the brake without engaging the clutch to permit the cable to payout freely under load tension.

Hydraulically controlled tractor winches have conventionally employed externally mounted swivel connectors coaxial with the rotational axis of the drums to convey pressurized hydraulic fluid to the internal fluid motors to actuate the brake or the clutch. External mounting of the swivel connections expose the swivel and the hydraulic supply line to the danger of being damaged which may result in shutdowns and costly repairs.

Winches having internal passage means or connectors have always encountered the problem of internal fluid leakage into the brake or clutch compartment even though caused by normal seal wear. Under these conditions, it is unable to determine when leakage occurs and the hydraulic leakage on to the clutch facing or the brake shoes reduces efficiency and may cause a complete shutdown due to failure of these frictional engaging surfaces.

The present invention provides internal passage means within the winch construction and a swivel fitting is positioned internally of the winch connecting a stator to a rotor member to supply actuating fluid to the clutch actuating means. Adjoining the swivel fitting is a chamber adapted to receive any fluid leakage to prevent the fluid from draining into the clutch or brake compartment. A vent is in communication with the chamber which leads externally to vent any fluid leakage externally of the brake and clutch housing which will provide visual evidence of leakage and a warning of a failure in the fluid system. This will eliminate unexpected breakdowns or shutdowns requiring costly repair because of hydraulic fluid on the brake lining or clutch facings.

It is an object of this invention to provide a hydraulic system for operating a tractor winch.

It is another object of this invention to provide a hydraulically actuated winch having an hydraulic actuator on a rotating member of the winch and a swivel connector in communication with the actuating chamber of the hydraulic actuator and the supply of actuating pressurized fluid.

It is a further object of this invention to provide a hydraulic swivel connector positioned on the axis of rotation for rotatably connecting a hydraulic actuator for the clutch on a rotating member and the supply line of pressurized fluid for actuating the hydraulic clutch.

The objects of this invention are accomplished by providing a winch having a live power shaft for driving a winding drum on the winch which is rotatably mounted on the gear housing and the clutch and brake housing. The clutch and brake includes a friction drum connected to the winding drum adapted for rotation relative to the housing. The drive shaft is connected to a rotor which carries a hydraulic fluid actuator and is connected to fluid passage means in the drive shaft. The fluid actuator radially expands a friction clutch facing against the friction drum. A spring actuated brake band is connected to the brake and clutch housing which frictionally engages the external periphery of the friction drum to hold the drums in a normally stationary position. A fluid actuator is mounted to overcome the force of the brake actuating spring and release the brake during the operation of the fluid clutch. Hydraulic passage means for actuating fluids are provided in the brake and clutch housing and leads to a point coincidental with the axis of rotation of the rotary member. A swivel connector positioned on the axis of rotation provides fluid communication between the activating passage means and the fluid actuator. A chamber adjoining and surrounding the swivel connector is in communication with a vent passage which vents fluid leakage externally of the brake and clutch housing. This prevents leakage of fluid into the brake and clutch compartment and provides a visual warning to the operator of the vehicle.

The preferred embodiments of this invention will be described in the following paragraphs and illustrated in the attached drawings.

Figure 1:
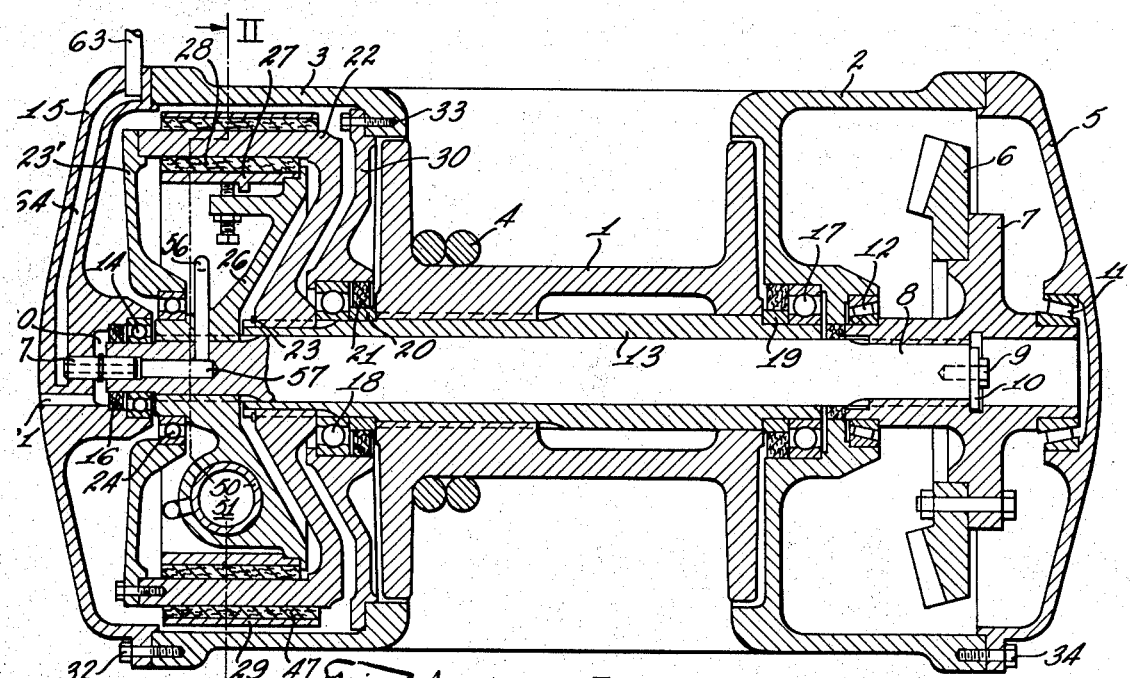
FIG. 1 illustrates a cross section view of the winch.

Referring to the drawings, FIG. 1 illustrates the mechanical driving means for the winch and the hydraulic actuators to operate the brake and clutch which control the operation of the winding drum. The brake is spring actuated and is normally in the engaged position, and the clutch is normally in the disengaged position and is actuated by the hydraulic system. The brake may be disengaged simultaneously to actuation of the clutch or the brake may be disengaged without actuating the clutch to merely permit payout of cable. The drum 1 is rotatably mounted between gear case 2 and the brake and clutch housing 3. The cable 4 is fastened to drum 1 by a conventional means. The gear case 2 together with the end plate 5 enclose the ring gear 6 which is driven by a pinion not shown. The ring gear 6 is fastened to a hub section 7 which is spline connected to drive shaft 8. A bolt 9 and fastening plate 10 hold the hub section 7 and the drive shaft 8 together.

The hub section 7 is rotatably supported on the right-hand end by a bearing assembly 11 seated within the annular recess of the end plate 5. The gear case 2 also defines an annular recess which receives the bearing assembly 12 for rotatably supporting the left-hand end of the hub section 7.

The drive shaft 8 drives through a hollow shaft 13 which extends through a central opening in drum 1. The drive shaft 8 is rotatably mounted on a left-hand end by the bearing assembly 14 which is supported in an annular recess of an end plate 15 which is fastened to the brake and clutch housing 3. The left-hand end of the drive shaft 8 is also equipped with a seal 16 adjacent the bearing assembly 14.

The hollow shaft 13 is spline connected to the winding drum 1 and is rotatably supported by the bearing assemblies 17 and 18. Gear casing 2 forms a bearing support for the bearing assembly 17. The hollow shaft 13 also carries a spacer 19 which is seated intermediate a shoulder on a hollow shaft and the winding drum 1, and the bearing assembly 17. On the opposite end of the hollow shaft 13, a similar spacer 20 is seated against a shoulder on the hollow shaft 13 radially inward of the seal 21. The seals 21 and 19 seal the internal compartments of the winch. The seals provide a sealing means to prevent foreign material from entering the bearing assemblies and the spacers also eliminate any axial movement of the winding drum in the assembly.

The friction drum 22 is internally splined which is complementary to the external splines on the outer periphery of hollow shaft 13. A friction drum 22 is retained in position by a snap ring 23 received within an annular recess on the left-hand end of the hollow shaft 13. Rotation of the friction drum is dependent upon the operation of the clutch or brake. The friction drum 22 is connected to a collar 23' which embraces bearing 24 seated on the axial flange 25 of the rotor 26. The rotor 26 is also internally splined and receives a complementary external splined portion of the drive shaft 8. The rotor 26 carries the clutch band 27 on its external periphery. The rotor 26 clutch band 27 in turn carries a plurality of clutch shoe segments 28 which are adapted for frictionally engaging the internal periphery of the friction drum 22 in response to hydraulic actuation. The hydraulic actuation means will be subsequently discussed.

The friction drum 22 has an external periphery adapted for engaging a brake band 29 which encircles the friction drum and its actuation will be discussed subsequently. The brake and clutch housing 3 encloses the brake and clutch and is positioned on the bearing retainer wall 30 which embraces the bearing 18 which in turn receives the hollow shaft 13. The brake and clutch housing is also supported by the end plate 15 which forms the left-hand end of the assembly.

The end plate 15 is fastened by means of a plurality of bolts 32 and the retainer wall 30 is fastened by means of plurality of bolts 33. The right-hand end plate 5 is similarly fastened by a plurality of bolts 34.

Figure 2:
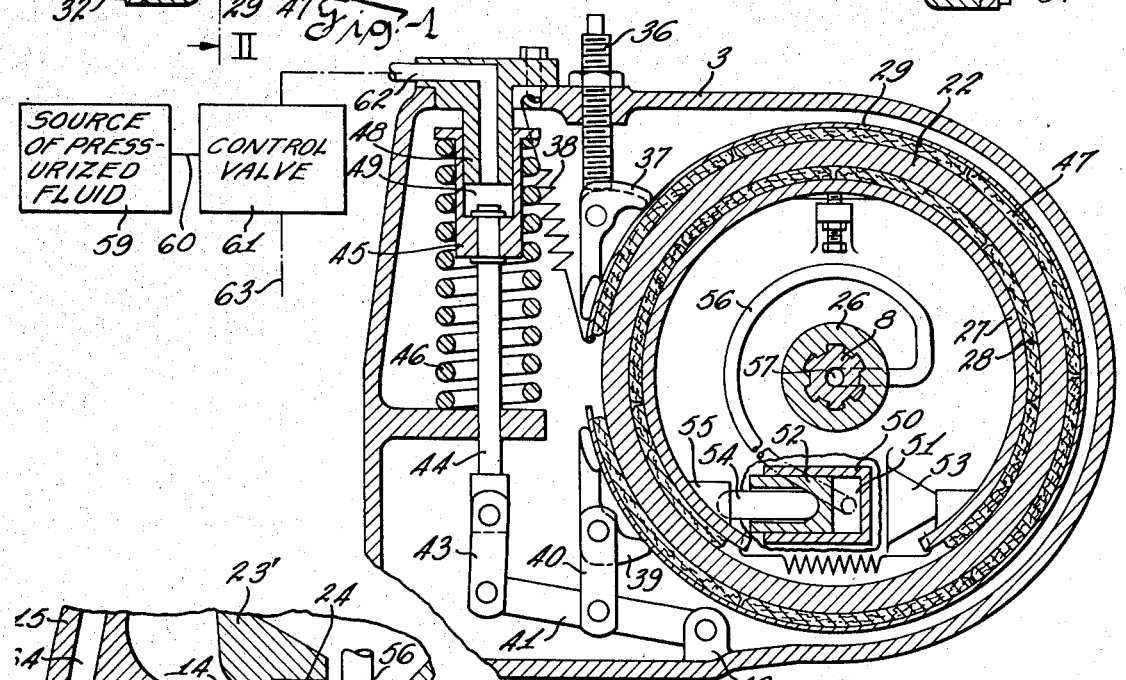
FIG. 2 is a cross section view of the winch taken on line II–II of FIG. 1 showing the brake and clutch compartment.

Referring to FIG. 2, a means for actuating a brake and clutch are illustrated. The brake band 29 is fastened on its upper end by means of the adjusting screw 36 and shoe support 37. A retraction spring 38 is connected to the housing 3 and the end of the brake band 29. The brake band 29 encircles the friction drum 22 and is similarly fastened on its opposite end by a shoe support 39 pivotally connected to the link 40 which in turn is connected to the actuating lever 41. The shoe supports 37 and 39 are interchangeable for reindexing to compensate for uneven wear and provide longer brake band life. The lever 41 is fulcrumed on the housing 3 by a stub 42. The lever 41 in turn is connected to the connector 43 the actuating rod 44 which is fastened to a spring retainer 45. The spring retainer 45 is received within the spring 46 which is under compression to bias the spring retainer 45 in an upward position and thereby frictionally engage the liners 47 of the brake band 29 with the external periphery of the friction drum 22. The spring retainer 45 forms a fluid cylinder which receives a piston 48 which is fastened to the housing 3. When fluid is pressurized in the chamber 49 the force of the hydraulic fluid overcomes the spring force and releases the brake.

The clutch is also hydraulically actuated by means of the clutch actuating cylinder 50 forming the pressurizing chamber 51 with the piston 52. The cylinder is connected to a stud 53 which engages the end of the clutch band 27 and the strut 54 engages a socket in the protrusion 55 on the opposite end of the clutch band 27. A hydraulic conduit 56 is connected to the pressure chamber 51 and the passage 57 in the shaft 8.

When fluid is pressurized within the chamber 51 the clutch band expands the clutch shoe segments 28 radially outward within the friction drum 22 thereby engaging the clutch. Engagement of the clutch produces the driving connection between the drive shaft 8 and the friction drum 22 which in turn is connected to the winding drum 1 which produces the winding of the cable.

A source of pressurized fluid 59 is connected by conduit means 60 to the control valve 61 which in turn delivers fluid to the brake line 62. The control valve is also connected through the fluid line 63 to the internal passage 64 for actuating the clutch. The internal passage 64 extends through the end plate 15 to a central opening 65 which is coaxial with a central opening 66 in the drive shaft 8. A center line of the opening 65 and 66 is coincidental with the axis of rotation of shaft 8 and the center of a swivel connector 67 received within these two openings. The connector 67 has an annular recess 68 to receive a snap ring 69 on the central portion and external periphery of the connector 67. The openings 65 and 66 each have an annular recess 70 and 71 respectively on their internal peripheries. The annular recesses 70 and 71 each receive a seal 72 and 73 respectively. The connector 67 is provided with a central opening 74 which connects the central passage 57 with the passage 64 thereby providing communication between the control valve 61 and the pressurizing chamber 51 in the clutch actuating cylinder. Normally the brake is engaged in response to the compressive force exerted by the spring 46 on the spring retainer 45. The valve 61 is positioned in a manner to permit the flow of pressurized fluid from the source of pressurized fluid 59 into the pressurizing chamber 49, the force of the hydraulic fluid in the pressure chamber 49 overcomes the compressive force of spring 46 which in turn disengages the brake and permits the friction drum 22 to rotate freely.

Figure 3:
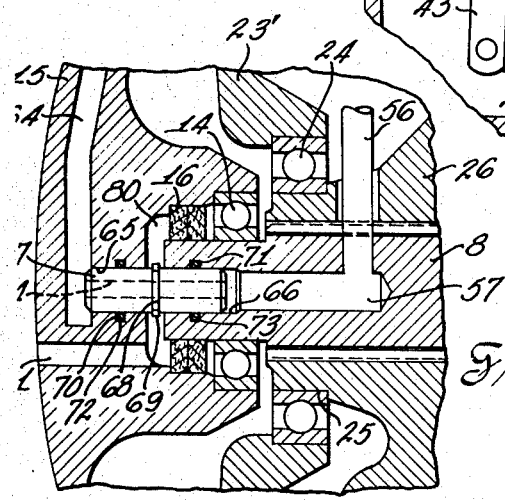
FIG. 3 is an enlarged cross section view of the swivel connector in the winch.

FIG. 3 illustrates an enlarged view of the drain passage. An annular recess 80 is formed in end plate 15 which receives bearing assembly 14 and seal 16 on the external periphery on the left-hand end of shaft 8. The chamber 80 is formed by the left-hand end of shaft 8 and the annular recess to the end plate 15. The swivel connector 67 extends through the chamber 80 and is sealed in the passage 65 and 66. Any leakage of fluid in this area between the stationary end plate 15 and the rotating shaft 8 will drain into the chamber 80. The connector 67 may move axially a limited amount but only to the extent that the snap ring 69 will allow axial movement. A vent passage 81 is connected to the chamber 80 at its lower side which vents any fluid leakage in chamber 80. Leakage of fluid will then run over the external surface of the end plate and provide visual evidence of failure of one of the seals. It can be seen that the danger of fluid leakage passing into the brake and clutch chamber is eliminated and consequently breakdown and costly repair will be avoided.

The operation of the winch will be described in the following paragraphs.

The drive shaft 8 is connected by complementary splines on the external periphery of the drive shaft 8 and internal periphery of the rotor 26. Normally, the brake band 29 carrying the frictional material 47 engages the external periphery of the friction drum 22. This engagement is accomplished by the force of spring 46 biasing the spring retainer 45 upwardly which causes the rod 44 to pivot the lever 41 and contract brake band 29 for frictional engagement of the friction drum. If it is desired to release the brake to payout the cable the valve 61 is actuated to allow fluid from the source of pressurized fluid 59 to pass through the conduit 62 and into the pressure chamber 49 wherein the force of the pressurized fluid will overcome the compressive force exerted by the spring 46 which maintains the brake in the on position. The increased pressure in the chamber 49 overcomes the spring force and releases the brake. Accordingly, the friction drum 22 which is connected to the winding drum 1 by means of hollow shaft 13 is then free to rotate.

When it is desired to carry a load on the cable and to wind up the cable on the winding drum 1 then the control valve 61 is operated in the manner to allow pressurized fluid from the source of pressurized fluid 59 to enter through the passage 64 to the swivel connector 67 into passage 57 in the shaft 8, to pass into the passage 57 and then is conveyed through the conduit 56 to the chamber 51 in the hydraulic fluid cylinder 50.

Pressurized fluid in the pressure chamber 51 causes the piston 52 to move axially from the cylinder 50 and radially expanding the clutch band 27 causing the plurality of clutch shoe segments 28 to expand radially and frictionally engage the inner periphery of the friction drum 22. When the clutch is engaged to permit taking in of the cable, the brake is released to permit the winch to be driven. The brake releasing action is preferably delayed until after engagement of the clutch in order to prevent reverse rotation of the winch under cable load. The control valve 61 is constructed in a manner to provide clutch engagement and brake release in order that the winch will carry the load when desired. It is further understood that the brake may be released without engaging the clutch if it is desired to provide slack in the cable.

The feature of use of a swivel fitting to provide fluid connection without danger of seal failure which may cause the fluid leakage to pass into the brake or drum compartment thereby damaging the frictional material will be described.

The fluid passage 64 receives pressurized fluid for actuating the clutch. This fluid passes to the swivel connector 67 which is positioned in the passage 65 in the end plate 15 and the passage 66 which is in the left-hand end of the shaft 8. The swivel connector is free to move a limited degree axially and is free to rotate or remain stationary relative to the end plate 15. The chamber 80 is in communication with the external side of the connector in fluid passage 65 and 66 and consequently any leakage of fluid by the seals 73 and 72 will drain into the chamber 80 and in turn will drain through the vent passage 81 to show visible evidence of seal failure and provide a warning to replace the seal.

The preferred embodiment of this invention has been illustrated and described and will be defined by the following attached claims.

I claim:

1. A hydraulic system for actuating a winch comprising, a rotatably mounted friction member defining a surface of rotation for engaging a friction element, a stator defining actuation fluid passage means, a rotor member rotatably mounted in said stator and defining an axis of rotation with actuating fluid passage means on said axis, a fluid actuator means and a fluid actuated element on said rotor member for frictionally engaging the surface of said friction member, a sleeve connector rotatably engaging and connected to said rotor member and said stator and connecting said actuating fluid passage means in said rotor member with said actuating fluid passage means in said stator, said rotor member and said stator defining a sealed chamber adjoining said sleeve connector, said stator defining an external surface, vent passage means in said stator communicating with said chamber for externally venting any fluid leakage from said chamber to said external surface thereby providing visual evidence of failure of said connector producing leakage of said hydraulic system.

2. A hydraulic system for actuating a winch as set forth in claim 1 wherein said rotor member and said stator each define an annular recess on their internal periphery surrounding said connector, and a seal in each of said recesses engaging said connector and sealing said fluid passage means of said stator and said rotor member.

3. A hydraulic system for actuating a winch as set forth in claim 1 including a bearing assembly rotatably supporting said rotor member on said stator, and a seal intermediate said bearing assembly and said chamber sealing said chamber from said bearing assembly.

4. A hydraulic system for actuating a winch as set forth in claim 1 including said connector defining an annular recess on its outer periphery, a snap ring received in said recess for axially centering said connector.